United States Patent [19]

Baba

[11] Patent Number: 5,021,951

[45] Date of Patent: Jun. 4, 1991

[54] DATA PROCESSOR

[75] Inventor: Shiro Baba, Tokorozawa, Japan

[73] Assignee: Hitachi, Ltd., Tokyo, Japan

[21] Appl. No.: 560,230

[22] Filed: Jul. 25, 1990

Related U.S. Application Data

[63] Continuation of Ser. No. 442,304, Nov. 28, 1989, abandoned, which is a continuation of Ser. No. 240,602, Sep. 6, 1988, abandoned, which is a continuation of Ser. No. 799,795, Nov. 20, 1985, abandoned.

[30] Foreign Application Priority Data

Nov. 26, 1984 [JP] Japan ............................ 59-248109

[51] Int. Cl.$^5$ ............................................ G06F 13/00
[52] U.S. Cl. .................................. 364/200; 364/232.8; 364/246.91; 364/247.2; 365/222; 365/230; 365/02
[58] Field of Search ... 364/200 MS File, 900 MS File; 365/222, 230.01, 230.02

[56] References Cited

U.S. PATENT DOCUMENTS 4,628,482 12/1986 Tachiuchi et al. ............... 364/900
4,755,964 7/1988 Miner ................................ 364/900

Primary Examiner—Michael R. Fleming
Assistant Examiner—Debra A. Chun
Attorney, Agent, or Firm—Antonelli, Terry, Stout & Kraus

[57] ABSTRACT

A microprocessor has a register in which attributive data corresponding to a memory to be coupled to the microprocessor is written, and a control circuit which controls address signals to be supplied to the memory in accordance with the attributive data. The attributive data is composed of range data for discriminating ranges of address data supplied to an address bus, system data indicative of addressing systems of the memories corresponding to the respective address ranges, and bit number data indicative of numbers of address bits of the memories. Thus, in a case where the memory to be accessed is of an address multiplexing system as in a dynamic RAM, the address data of the address bus is divided into row address data and column address data, which are then supplied to the memory in time division.

21 Claims, 8 Drawing Sheets ly not only the static RAM but also the dynamic RAM can be accessed, and the latter can be refreshed without disposing any external circuit, to facilitate the design of a system and to reduce the packaging area of the system.

DATA PROCESSOR

This application is a continuation of application Ser. No. 442,304, filed on Nov. 28, 1989, which is a continuation of U.S. Ser. No. 240,602 filed Sept. 6, 1988, which is a continuation of U.S. Ser. No. 799,795 filed Nov. 20, 1985.

BACKGROUND OF THE INVENTION

This invention relates to data processing technology, and more particularly to technology which is especially effective when applied to a microprocessor.

A microcomputer system is constructed of a microprocessor, storage devices such as a ROM (read-only memory) and a RAM (random access memory), an input/output interface (I/O), etc. In this case, the use of a dynamic RAM is better than the use of a static RAM because of the merit that the system can be arranged less expensively.

Since, however, the dynamic RAM requires an address multiplexing system and requires a refresh operation, the control thereof is more troublesome than those of the ROM and the static RAM. Therefore, any of prior-art microprocessors has been constructed so as to be capable of direct access to the ROM and the static RAM. When arranging the system to use a dynamic RAM. it has been necessary to dispose complicated external circuits including circuits for forming $\overline{RAS}$ (row address strobe) signal, $\overline{CAS}$ (column address strobe) signal and a signal $\overline{RFSH}$, which indicates a refresh timing, which are required for operating the dynamic RAM on the basis of clock signals or control signals delivered from the microprocessor (refer to 'Microcomputer' published by CQ Shuppan Kabushiki-Kaisha, No. 6, 1982, pp. 87-89).

In this manner, the use of the dynamic RAM for the prior-art microprocessor has led to the problems that the design of the system becomes difficult and that the packaging area of the system becomes large.

A certain prior-art microprocessor has a built-in refresh counter which generates the refresh address of the dynamic RAM. Even with such a microprocessor, the $\overline{RAS}$ signal and the $\overline{CAS}$ signal must be produced by the external circuits.

SUMMARY OF THE INVENTION

An object of this invention is to provide a microprocessor which facilitates the design of a system employing a dynamic RAM and which can reduce the packaging area of the system.

Another object of this invention is to provide a microprocessor of high versatility in which the capacity and number of dynamic RAMs to be used, the positions of dynamic RAM areas in an address space, and so forth can be freely changed.

The aforementioned and other objects and novel features of this invention will become apparent from the description of the specification and the accompanying drawings.

Typical aspects of performance of this invention will be summarized below.

A microprocessor comprises therein a refresh counter which generates a refresh address, a control signal forming circuit which forms control signals, such as $\overline{RAS}$ signal and $\overline{CAS}$ signal, required for accessing a dynamic RAM, and a register which designates either access to the dynamic RAM or access to a static RAM (or a ROM), an address outputting mode being alterable in accordance with the content of the register, whereby not only the static RAM but also the dynamic RAM can be accessed, and the latter can be refreshed without disposing any external circuit, to facilitate the design of a system and to reduce the packaging area of the system.

In addition, the above register comprises registers which designate the address ranges and capacities of the dynamic RAMs to be used, namely, the number of bits of address signals, thereby to provide a microprocessor of high versatility in which the capacities or number of the dynamic RAMs to be used can be changed freely to some extent.

PREFERRED EMBODIMENTS

[Embodiment 1]

Figure 1:
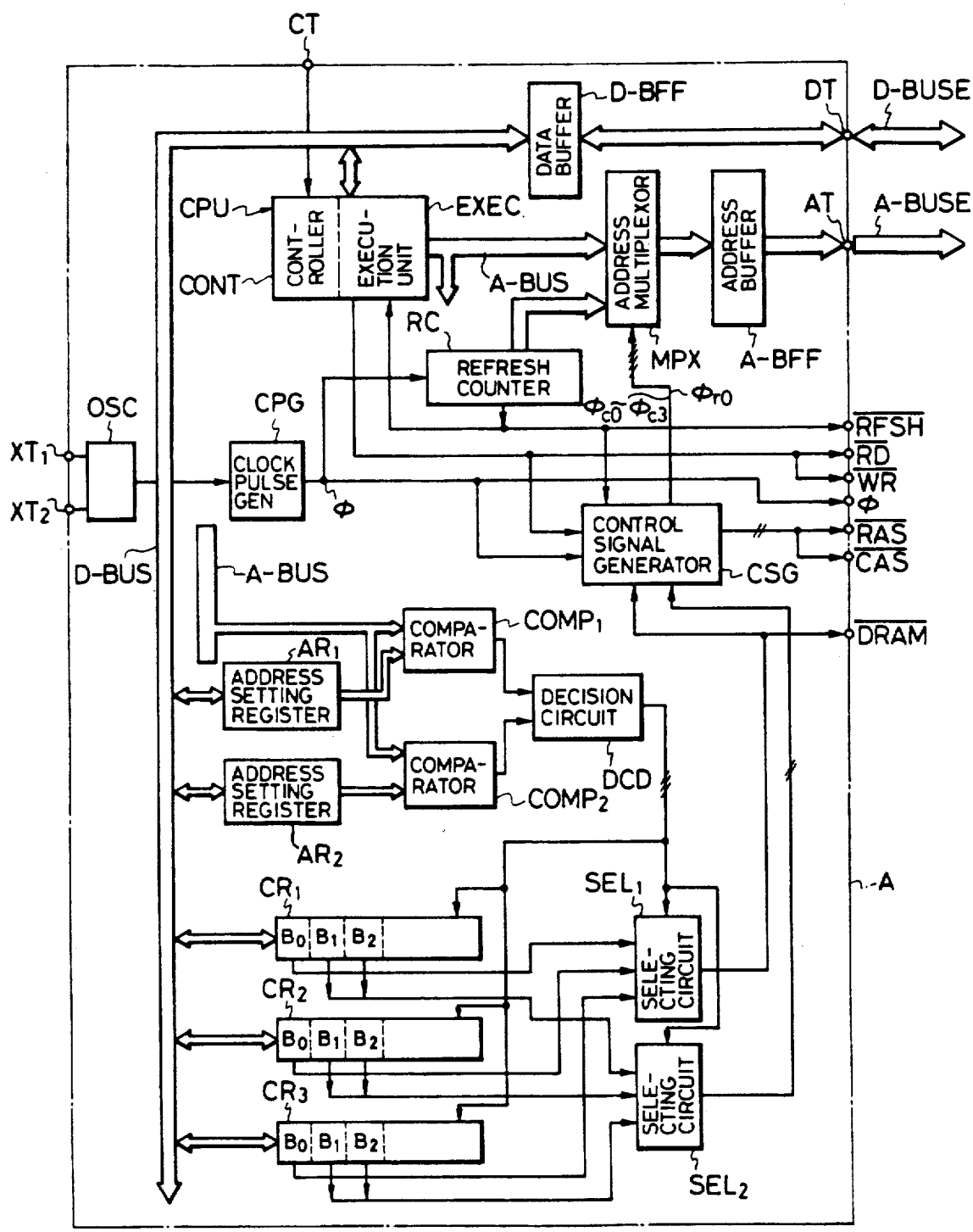
FIG. 1 is a block diagram showing an embodiment of a microprocessor according to the present invention.

FIG. 1 is a circuit block diagram of one embodiment in the case of applying the present invention to a 16-bit microprocessor. In the figure, a portion enclosed with a chain line A is formed on a single semiconductor substrate such as single-crystal silicon by known semiconductor production technology.

In FIG. 1, shown by circuit symbol CPU is a microprocessor portion. Although this microprocessor portion CPU, the practicable arrangement of which is not directly pertinent to the present invention, is not illustrated in detail, it is constructed of for example execution unit EXEC which is composed of an arithmetic-logic unit, dedicated registers such as a program counter, a stack pointer, a status register, and general-purpose registers for use as work areas, and a controller CONT which is composed of an instruction register to which microprogram instructions read out from an external memory not shown are successively input, micro ROMs in which microinstructions corresponding to respective macroinstructions are stored, and so on.

The execution unit EXEC is operated in a proper sequence which is determined by control signals delivered from the controller CONT. Thus, desired data processing is executed. Coupled to the controller CONT are external terminals CT which are supplied with interrupt signals and reset signals.

In order to control the operating timings of the microprocessor portion CPU, an oscillator OSC and a clock pulse generator CPG are provided. The oscillator OSC has its oscillation frequency determined by a circuit element, such as quartz vibrator or ceramics vibrator not shown, which is coupled between external terminals $XT_1$ and $XT_2$. The clock pulse generator CPG receives the oscillation output of the oscillator OSC and properly divides its frequency, thereby to form a system clock $\phi$.

In this embodiment on the same semiconductor substrate as that of the microprocessor portion CPU, there are disposed a refresh counter RC which generates a refresh address of a dynamic RAM, an address multiplexor MPX which selects either the address from the refresh counter RC or an address that is delivered from the execution unit EXEC to an address bus line A-BUS, and a control signal generator CSG which controls the operation of the address multiplexor MPX.

The refresh counter RC is operated by the operating clock signal $\phi$ of the system, and outputs a synchronizing signal $\overline{RFSH}$ indicative of the timing of refresh about once every 2 milliseconds. The refresh counter RC also forms address signals for accessing the respective memory rows of the dynamic RAM, within the cycle of the synchronizing signal $\overline{RFSH}$. The synchronizing signal $\overline{RFSH}$ is also fed to the microprocessor portion CPU and the control signal generator CSG.

When the synchronizing signal $\overline{RFSH}$ has been generated, the microprocessor portion CPU is prohibited from accessing the address bus A-BUS Simultaneously therewith, switching control signals to be described in detail later are supplied from the control signal generator CSG to the address multiplexor MPX. In accordance with the switching control signals, the multiplexor MPX selects the refresh address supplied from the refresh counter RC, instead of the address signals on the address bus A-BUS. The address signals selected by the multiplexor MPX are output to an external address bus A-BUSE through an address buffer A-BFF.

Further, the synchronizing signal $\overline{RFSH}$ supplied from the refresh counter RC to the control signal generator CSG is externally fed as the signal $\overline{RFSH}$ indicative of the refresh timing.

According to this embodiment, though it is not especially restricted, a plurality of address spaces to correspond to a plurality of different types of memories and data indicating the attributes of the respective memories are set in the microprocessor in order to permit the memories to be simultaneously coupled to external address terminals AT.

Although not especially restricted, the embodiment is provided for discriminating the plurality of address spaces with two address setting registers $AR_1$ and $AR_2$, two comparators $COMP_1$ and $COMP_2$ which compare the contents of the address setting registers $AR_1$ and $AR_2$ with the address delivered from the microprocessor portion CP onto the address bus A-BUS and decide the relations of magnitudes thereof, respectively, and a decision circuit DCD which decides which address range the address signal on the address bus A-BUS falls within, by reference to the outputs of the two comparators $COMP_1$ and $COMP_2$. Each of the address setting registers $AR_1$ $AR_2$ has its operation controlled by the control signal delivered from the execution unit EXEC of the microprocessor portion CPU, and has address data written therein through a data bus D-BUS.

The data to be written into the address setting registers $AR_1$ and $AR_2$ is stored along with programs to be executed by the shown microprocessor, in an unshown ROM the address terminals of which are coupled to the external address bus lines A-BUSE and the data output terminals of which are coupled to external data bus D-BUSE.

The data is set in the address setting registers $AR_1$ $AR_2$ as follows by way of example.

Upon start of the execution of a program for the data setting, the data to be written into the register $AR_1$ is read out from the unshown ROM and is once written into an unshown working resister within the execution unit EXEC through a data buffer D-BFF as well as the internal data bus lines D-BUS. Subsequently, the data of the working register is output to the internal data bus D-BUS, and the control signal for writing the data into the register $AR_1$ is output from the execution unit EXEC. Thus, the data of the data bus line D-BUS is written into the register $AR_1$. Also the register $AR_2$ has the data written thereinto according to a similar operating sequence.

Although no special restriction is intended, the respective contents of the address setting registers $AR_1$ $AR_2$ can be read out through the data bus D-BUS.

The whole memory space can be divided in three in accordance with the data set in the two address setting registers $AR_1$ and $AR_2$. Although not especially restricted, L the address data of the address setting register $AR_1$ signifies the head address of the second address space among the first to third address spaces, and that of the address setting register $AR_2$ signifies the head address of the third address space.

That is, the data of the register $AR_1$ makes it possible to identify the boundary between the first address space and the second address space, and that of the register $AR_2$ makes it possible to identify the boundary between the second address space and the third address space.

For example, if the address data items of the address setting registers $AR_1$ and $AR_2$ are "400000" and "B00000" in hexadecimal numbers respectively, the first address space is set to an address range from "000000" to "3FFFFF", and the second address space is set to an address range from "400000" to "AFFFFF" Likewise, the third address space is set to a range from "B00000" to "FFFFFF"

The ranges of the address data supplied from the CPU to the address bus lines A-BUS are decided by the comparators $COMP_1$, $COMP_2$ and the decision circuit DCD.

The comparator $COMP_1$ compares the address data of the address bus lines A-BUS with the data set in the register $AR_1$. This comparator $COMP_1$ outputs "1" if the address data of the address bus lines A-BUS is greater than that of the register $AR_1$, and it outputs "0" if not.

Likewise, the comparator $COMP_2$ outputs "1" if the address data of the address bus lines A-BUS is greater than that of the register $AR_2$, and it outputs "0" if not.

Thus, the combinations of the outputs of the comparators $COMP_1$ and $COMP_2$ are brought into one-to-one correspondence with the address spaces of the address data of the address bus lines A-BUS.

The decision circuit DCD is, in effect, constructed of a decoder which decodes the outputs of the comparators $COMP_1$ and $COMP_2$. On the basis of the outputs of the comparators $COMP_1$ and $COMP_2$, the decision circuit DCD provides three sorts of control signals which indicate the address spaces of the data of the address bus lines A-BUS. The output of the decision circuit DCD is used as the operation control signals of selecting circuits $SEL_1$ and $SEL_2$ to be described later.

In correspondence with the three address spaces or ranges divided by the address data set in the address setting registers $AR_1$ $AR_2$, there are disposed registers (hereinbelow, termed 'configuration registers') $CR_1$–$CR_3$ each including stages $B_0$–$B_2$ in which the data indicating the property of the memory corresponding to the address range is written. Similarly to the address setting registers $AR_1$ $AR_2$, the configuration registers $CR_1$ to $CR_3$ have the setting of data therein controlled by the CPU. That is, the data for the configuration registers $CR_1$ to $CR_3$ is supplied through the data bus D-BUS.

In each of these configuration registers $CR_1$–$CR_3$, the bit $B_0$ is used for data which corresponds to the addressing mode of the memory to be externally connected through the external bus lines A-BUSE and D-BUSE, and the bits $B_1$ and $B_2$ are used for data which corresponds to the storage capacity of the memory to be externally connected.

Although not especially restricted, the bit $B_0$ is set at "1" for a memory of the address multiplexing system such as a dynamic RAM, in other words, for a memory to which two kinds of address data items such as a row-group address and a column-group address are to be supplied in time division, and it is set at "0" or a memory to which two kinds of address data items are to be simultaneously supplied, such as a ROM or a static RAM.

The two bits consisting of the bits $B_1$ and $B_2$ correspond to four sorts of storage capacities. By way of example, the combinations of the bits $B_1$ and $B_2$; "00", "01", "10" and "11" correspond respectively to the storage capacities of 16 kilobits, 64 kilobits, 256 kilobits and 1 megabit.

Figure 2:
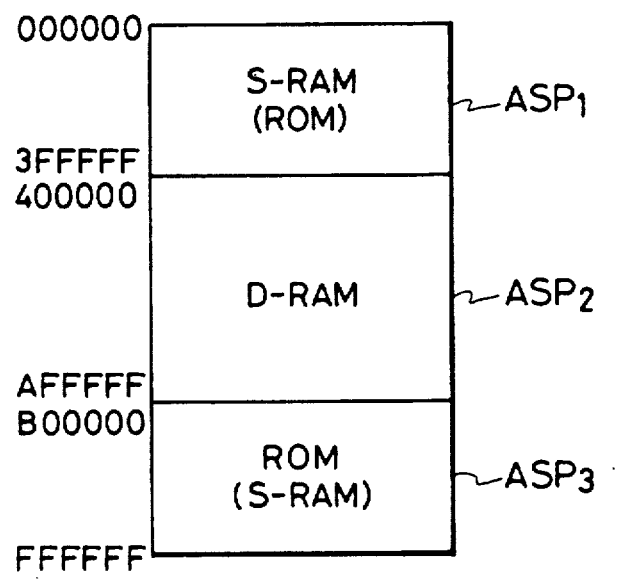
FIG. 2 is a memory map showing an example of the state of address spaces divided by address setting registers.

Now, by way of example, let's consider a case where the address setting registers $AR_1$ and $AR_2$ are respectively set at "400000" and "B00000" in hexadecimal numbers and where the bits $B_0$ of the configuration registers $CR_1$–$CR_3$ are respectively set at '0', '1' and '0'. Here, the value '0' of the bit $B_0$ signifies the address range of the ROM or the static RAM other than the dynamic RAM, and the value '1' of the bit $B_0$ signifies the address range of the dynamic RAM, as described before. Thus, in a case where the contents of the address setting registers $AR_1$ $AR_2$ and the registers $CR_1$ to $CR_3$ are respectively set as stated above, the address range of addresses "000000" to "3FFFFF" as illustrated in FIG. 2 becomes the first address space or address region $ASP_1$ directed to the static RAM or the ROM, the address range of addresses "400000" to "AFFFFF" becomes the second address space $ASP_2$ directed to the dynamic RAM, and the address range of addresses "B00000" to "FFFFFF" becomes the third address space $ASP_3$ directed to the ROM or the static RAM.

The information items of the bits $B_0$ of the respective configuration registers $CR_1$–$CR_3$ are passed through the selecting circuit $SEL_1$ whose switching operation is effected with the decision output signal of the decision circuit DCD, whereby one of the information items is selectively supplied to the control signal generator CSG. More specifically, if the address delivered onto the address bus A-BUS lies between "000000" and "3FFFFF", the selecting circuit $SEL_1$ which is controlled by the output of the decision circuit DCD at that time functions to supply the control signal generator CSG with the content of the bit $B_0$ of the configuration register $CR_1$ Meanwhile, if the address on the address bus lies between "400000" and "AFFFFF", the content of the bit $B_0$ of the configuration register $CR_2$ is supplied to the control signal generator CSG, and if the address on the address bus lines between "B00000" and "FFFFFF", the content of the configuration register $CR_3$ is supplied to the same.

The decision circuit DCD, the configuration registers $CR_1$–$CR_3$ and the selecting circuit $SEL_1$ constitute address decision means.

When the information of the bit $B_0$ supplied from the selecting circuit $SEL_1$ is '0', the control signal generator CSG forms control signals with which address data items $A_0$–$A_{23}$ on the address bus A-BUS are passed through the address multiplexor MPX as they are so as to be supplied to the address buffer A-BFF, and it delivers the control signals to the address multiplexor MPX. On the other hand, when the information of the bit $B_0$ supplied thereto is '1', the control signal generator CSG causes a latch circuit (not shown) within the address multiplexor MPX to accept the signal of a part corresponding to upper bits (or lower bits) required for accessing the dynamic RAM, among the address data items delivered from the microprocessor portion CPU onto the address bus A-BUS, and it allows the signal of a part corresponding to the lower bits (or the upper bits) of the address, to pass through the address multiplexor MPX as it is, thereby to deliver this signal as a row address signal. Subsequently, the control signal generator CSG functions to send the upper bits (or lower bits) of the address already held in the latch circuit within the address multiplexor MPX, from the address multiplexor MPX to the address buffer A-BFF and to externally deliver them as a column address signal from the same address terminals as those of the row address signal.

Figure 3:
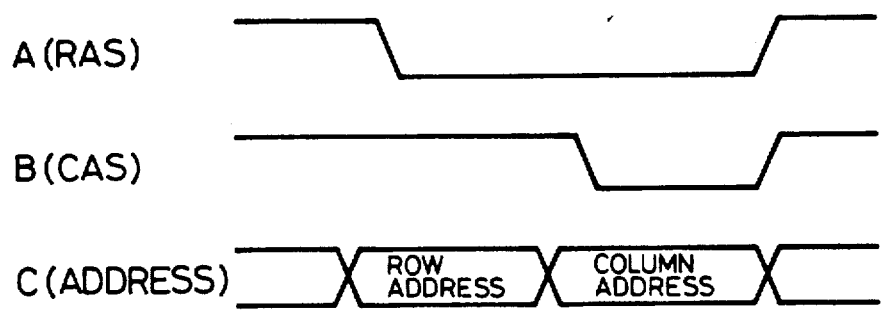
FIG. 3 is a timing chart showing the timings of address signals and control signals in the case of accessing a dynamic RAM.

Thus, when the address range of the dynamic RAM has been accessed, the upper bits and the lower bits of the address are delivered out individually, namely, by the address multiplexing system. Moreover, in the above case, when the row address signal is output from the address multiplexor MPX, a $\overline{RAS}$ signal (row address strobe signal) of low level is formed and delivered by the control signal generator CSG in synchronism with this row address signal as shown in FIG. 3, and when the column address signal is output from the address multiplexor MPX, a $\overline{CAS}$ signal (column address strobe signal) of low level is formed and delivered.

The dynamic RAM connected to the microprocessor of this embodiment is accessed in synchronism with the falling edges of the $\overline{RAS}$ signal and the $\overline{CAS}$ signal and by accepting the addresses delivered from the address buffer A-BFF at those times, whereby desired data can be read out.

The data bus D-BUS has the data buffer D-BFF connected thereto, the latter serving to input and output data between it and the unshown external memories through external data terminals DT as illustrated in FIG. 1.

In contrast, when an address signal outside the address range of the dynamic RAM has been output from the microprocessor portion CPU, the address signal passes through the address multiplexor MPX without any change and is delivered out as it is.

Further, the information items of the sets of the bits $B_1$ and $B_2$ in the configuration registers $CR_1$–$CR_3$ pass through the selecting circuit $SEL_2$ whose switching state is controlled by the output of the decision circuit DCD, whereby one of the sets is sent to the control signal generator CSC. When the bits $B_1$ and $B_2$ of any of the configuration registers $CR_1$-$CR_3$ subject to the bit $B_0$ being set at '1' are set at '0, 0' by way of example, they indicate that the capacity of the corresponding dynamic RAM is 16 kbits, as stated before. In addition, when they are '0, 1', they indicate the capacity of 64 kbits; when they are '1, 0', they indicate the capacity of 256 kbits; and when they are '1, 1', they indicate the capacity of 1 Mbit.

When supplied with the information items of the bits $B_1$ and $B_2$ of any of the configuration registers $CR_1$-$CR_3$, the control signal generator CSC operates subject to these bits being '0, 0', to recognize 14 bits (for example, $A_1$-$A_{14}$) in the signal on the address bus A-BUS as the formal address of the dynamic RAM and to latch half ($A_8$-$A_{14}$) of the bits in the address multiplexor MPX and pass the remaining half ($A_1$-$A_7$) therethrough without any change. Thereafter, the circuit CSG causes the address multiplexor MPX to deliver the half ($A_8$-$A_{14}$) to the same external terminals Subject to the bits $B_1$ and $B_2$ being '0, 1', the control signal generator CSG operates to recognize 16 bits (for example, $A_1$-$A_{16}$) in the signal on the address bus as the formal address and to latch half ($A_9$-$A_{16}$) of the bits in the multiplexor MPX and pass the remaining half ($A_1$-$A_8$) therethrough without any change. Subject to the bits $B_1$ and $B_2$ being '1, 0'or '1, 1', the control signal generator CSG similarly operates to halve the signal of 18 bits or 20 bits and deliver it in two divided steps.

In the address signal $A_0$-$A_{23}$ delivered from the microprocessor portion CPU the bits not used for the access to the dynamic RAM are once latched in the address multiplexor MPX and are successively delivered out while the lower bits and upper bits are sequentially output as stated above. An address decoder installed on a memory board, for example, forms a chip select signal on the basis of the delivered bits so as to select the dynamic RAM.

Further, in this embodiment, the signal which is supplied from the selecting circuit $SEL_1$ to the control signal generator CSG and which indicates the information specifying whether or not the address range is of the dynamic RAM is delivered out as a signal $\overline{DRAM}$. Owing to this signal $\overline{DRAM}$, whether or not the microprocessor is accessing the dynamic RAM can be known. It is also possible, for example, to use this signal as the chip select signal of the dynamic RAM or to bring the ROM or the static RAM into an unselected state with this signal.

Figure 4:
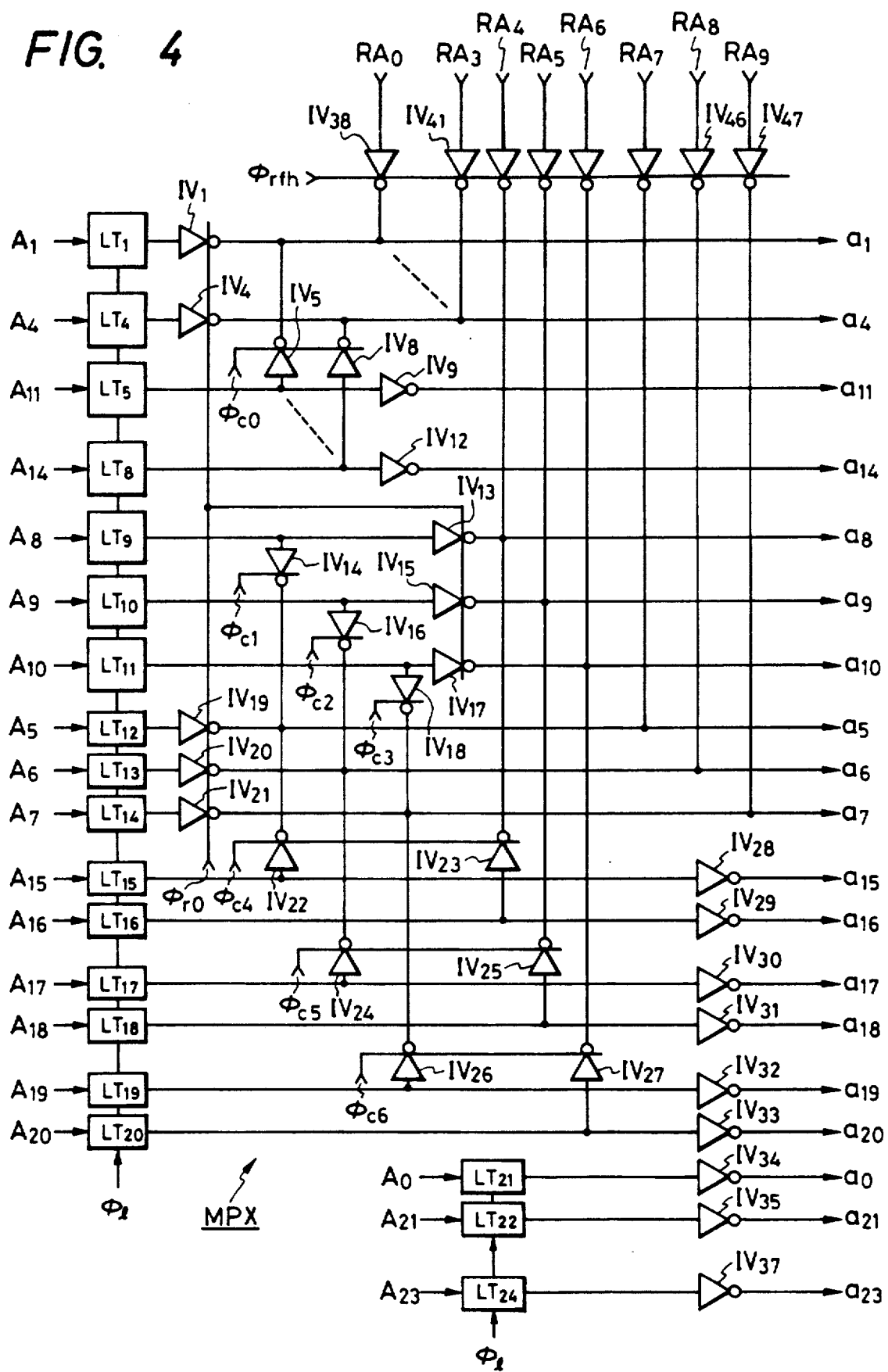
FIG. 4 is a circuit diagram of an address multiplexor.

FIG. 4 shows a practicable circuit arrangement of the multiplexor MPX.

The multiplexor MPX is constructed of latch circuits $LT_1$ thru $LT_{24}$ the input terminals of which are coupled to corresponding address lines $A_1$ thru $A_{20}$, $A_0$, and $A_{21}$ thru $A_{23}$ constituting the address bus and the data accepting timings of which are controlled by a timing signal $\phi_l$, and inverter circuits $IV_1$ thru $IV_{47}$.

Among the inverter circuit $IV_1$ thru $IV_{47}$, those $IV_1$ thru $IV_8$, $IV_{13}$ thru $IV_{27}$, and $IV_{38}$ thru $IV_{47}$ are clocked inverter circuit the operations of which are respectively controlled by timing signals $\phi_{r0}$, $\phi_{c0}$ thru $\phi_{c6}$, and $\phi_{ref}$.

Figure 7:
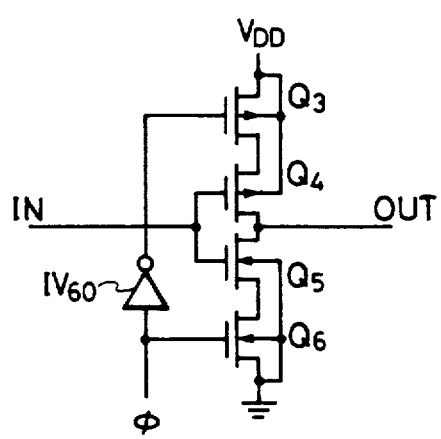

Although not especially restricted, each of the clocked inverter circuits is constructed, as shown in FIG. 7, of P-channel output MOSFETS $Q_3$ and $Q_4$ which are serially connected between a power source terminal $V_{DD}$ and an output terminal OUT, and N-channel MOSFETs $Q_5$ and $Q_6$ which are serially connected between the output terminal OUT and the ground point of the circuit. The MOSFETs $Q_4$ and $Q_5$ have their gates coupled to an input terminal IN, the MOSFET $Q_6$ has its gate coupled to a control line $\phi$, and the MOSFET $Q_3$ has its gate coupled to the control line $\phi$ through an inverter $IV_{60}$.

When a control signal supplied to the control line $\phi$ (hereinbelow, written as 'control signal $\phi$') is at a high level, the clocked inverter circuit of the above arrangement is responsively brought into an operating state and supplies the output terminal OUT with an output signal which is inverted in level with respect to an input signal fed to the input terminal IN. When the control signal $\phi$ is at a low level, the clocked inverter circuit is brought into a latch state. That is, the output of the clocked inverter circuit is held at a previous output level irrespective of the level of an input signal by a holding capacitance not shown, e.g., a stray capacitance coupled to the output terminal.

Figure 6:
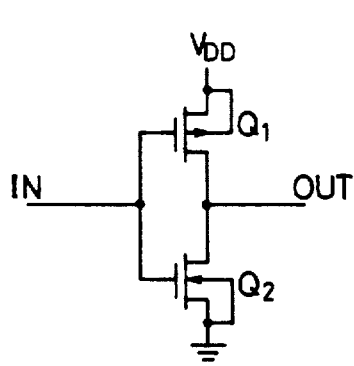
FIGS. 6 and 7 are circuit diagrams of an inverter circuit and a clocked inverter circuit respectively.

FIG. 6 shows a circuit example of the inverter circuit.

In FIG. 4, the clocked inverter circuits $IV_5$ thru $IV_8$, $IV_{14}$, $IV_{16}$, $IV_{18}$, and $IV_{22}$ thru $IV_{27}$ can be regarded as column selection circuits as will be understood from later description.

The clocked inverter circuits $IV_{38}$ thru $IV_{47}$ in FIG. 4 have their respective input terminals $RA_0$ thru $RA_9$ coupled to the output terminals of the refresh counter RC in FIG. 1.

Figure 5:
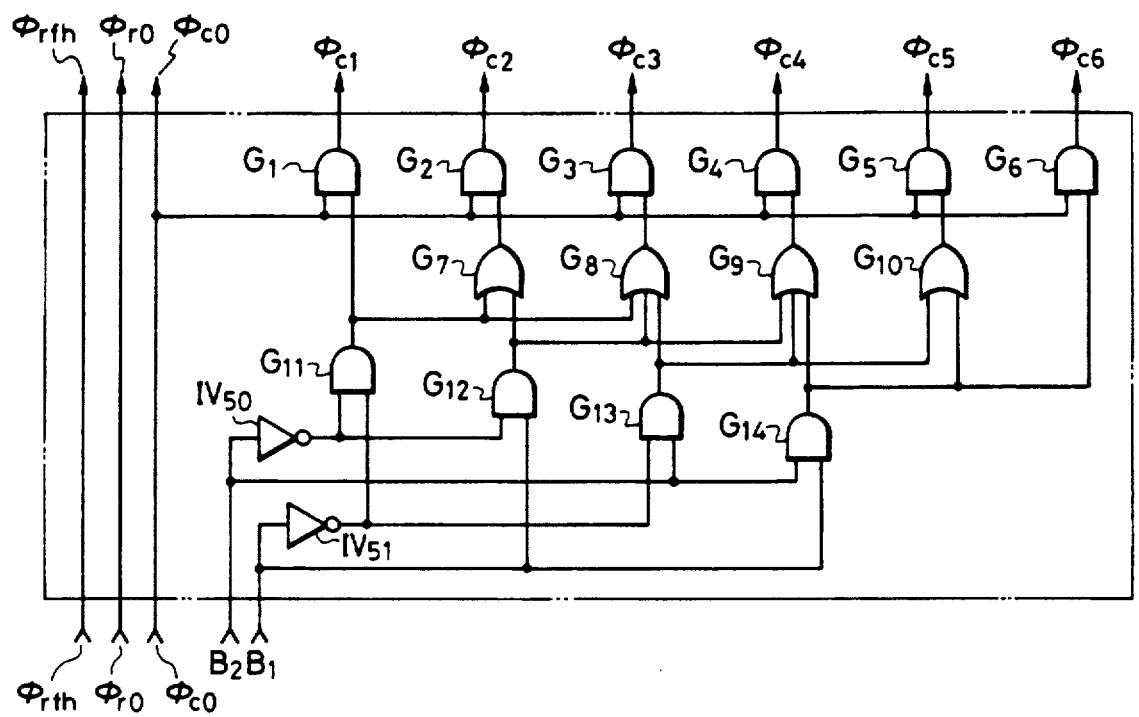
FIG. 5 is a circuit diagram of a control signal generator.

The timing signals or control signals $\phi_l$, $\phi_{r0}$, $\phi_{c0}$ thru $\phi_{c6}$, and $\phi_{ref}$ for controlling the operation of the multiplexor MPX are produced from the control signal generator CSG FIG. 5 is a circuit diagram of Part of the control signal generator CSG.

The control signal $\phi_{ref}$ which is supplied to the circuit in FIG. 5 is formed, for example, in such a way that the refresh control signal $\overline{RFSH}$ delivered from the refresh counter RC in FIG. 1 is inverted by an inverter circuit.

The timing signal $\phi_{r0}$ is, in effect, regarded as an upper- (or lower-) bit select signal.

This timing signal $\phi_{r0}$ is brought to the high level or "1" level in the first half of the cycle of the clock signal $\phi$ (hereinbelow, termed the first cycle) if the bit signal $B_0$ delivered from the selecting circuit $SEL_1$ in FIG. 1 is "1", in other words, if the bit $B_0$ of the configuration register selected by the selecting circuit $SEL_1$ indicates the address multiplexing system, and it is brought to the high level in the first cycle and the succeeding second cycle if the bit signal $B_0$ is "0" The timing signal $\phi_{r0}$ is responsively brought to the low level or "0" level if the refresh control signal $\overline{RFSH}$ is at the low level, that is, it indicates the refresh operation.

Though not shown, a circuit for forming such a timing signal $\phi_{r0}$ is as follows by way of example.

The circuit is constructed of a pulse formation circuit which receives the output of the clock pulse generator CPG in FIG. 1, thereby to form a first clock signal having the aforementioned first cycle and a second clock signal having the aforementioned first and second cycles; a first gate circuit made up of an AND circuit which forms the logical product signal among the bit signal $B_0$ delivered from the selection circuit $SEL_1$, the first clock signal, and the control signal $\overline{RFSH}$; a second gate circuit made up of an AND circuit which forms the logical product signal among the inverted signal of the bit signal $B_0$, the second clock signal, and the control signal $\overline{RFSH}$; and a third gate circuit which forms the logical sum signal between the outputs of the first and second gate circuits. As is well known in the LSI technology, an AND circuit is composed of a NAND circuit and an inverter circuit, and an OR circuit is composed of a NOR circuit and an inverter circuit.

The timing signal $\phi_{c0}$ is regarded as a lower (or upper) bit select signal.

This timing signal $\phi_{c0}$ is held at the high level in the aforementioned second cycle if the bit signal $B_0$ output from the selection circuit $SEL_1$ in FIG. 1 is "1", whereas it is held at the "0" level or low level in response to the value "0" of the bit signal $B_0$, as well as the low level ("0" level) of the signal $\overline{RFSH}$.

By way of example, the timing signal $\phi_{c0}$ is generated by an AND circuit which forms the logical product signal among the first and second clock signals, the inverted signal of the bit signal $B_0$, and the control signal $\overline{RFSH}$.

Referring to FIG. 5, a gate circuit $G_{11}$ made up of an AND circuit has its output brought to the "1" level or high level responsively when the bit signals $B_1$ and $B_2$ supplied from the selection circuit $SEL_2$ in FIG. 1 are "0" and "0", in other words, when the combination of the bit signals $B_1$ and $B_2$ indicates a memory requiring address signals of 14 bits, such as a 16-kilobit memory of 1-bit format. A gate circuit $G_{12}$ has its output brought to the "1" level responsively when the bit signals $B_1$ and $B_2$ are "1" and "0" respectively, in other words, when they indicate a memory requiring address signals of 16 bits, such as a 64-kilobit memory of 1-bit format. Likewise, the outputs of gate circuits $G_{13}$ and $G_{14}$ are brought to the "1" level when the bit signals $B_1$ and $B_2$ indicate a memory requiring address signals of 18 bits, such as a 256-kilobit memory of 1-bit format, and a memory such as a 1-megabit memory, respectively.

A gate circuit $G_1$ made up of an AND circuit receives the output of the gate circuit $G_{11}$ and the timing signal $\phi_{c0}$. Therefore, when the bit signals $B_1$ and $B_2$ indicate the 16-kilobit memory, the output $\phi_{c1}$ of this gate circuit $G_1$ is brought to the "1" level in synchronism with the timing signal $\phi_{c0}$.

A gate circuit $G_2$ receives the output of an OR gate circuit $G_7$ supplied with the output of the gate circuit $G_{11}$ or $G_{12}$, together with the timing signal $\phi_{c0}$. Therefore, when the bit signals $B_1$ and $B_2$ indicate the 16-kilobit or 64-kilobit memory, the output $\phi_{c2}$ of this gate circuit $G_2$ is brought to the "1" level in synchronism with the timing signal $\phi_{c0}$.

Likewise, the timing signal $\phi_{c3}$ which is output from a gate circuit $G_3$ is brought to the "1" level in synchronism with the timing signal $\phi_{c0}$ when the combination of the bit signals $B_1$ and $B_2$ indicates the 16-kilobit, 64-kilobit or 256-kilobit memory, and the timing signal $\phi_{c4}$ which is output from a gate circuit $G_4$ is brought to the "1" level in synchronism with the timing signal $\phi_{c0}$ when the bit signals $B_1$ and $B_2$ indicate the 64-kilobit, 256-kilobit or 1-megabit memory.

If the bit signals $B_1$ and $B_2$ indicate the 256-kilobit or 1-megabit memory, the timing signal $\phi_{c5}$ is brought to the "1" level in synchronism with the timing signal $\phi_{c0}$, and if the bit signals $B_1$ and $B_2$ indicate the 1-megabit memory, the timing signal $\phi_{c6}$ is brought to the "1" level in synchronism with the timing signal $\phi_{c0}$.

The address multiplexor MPX in FIG. 4 is operated in response to the timing signals which are output from the control signal generator CSG in FIG. 5.

Figure 8:
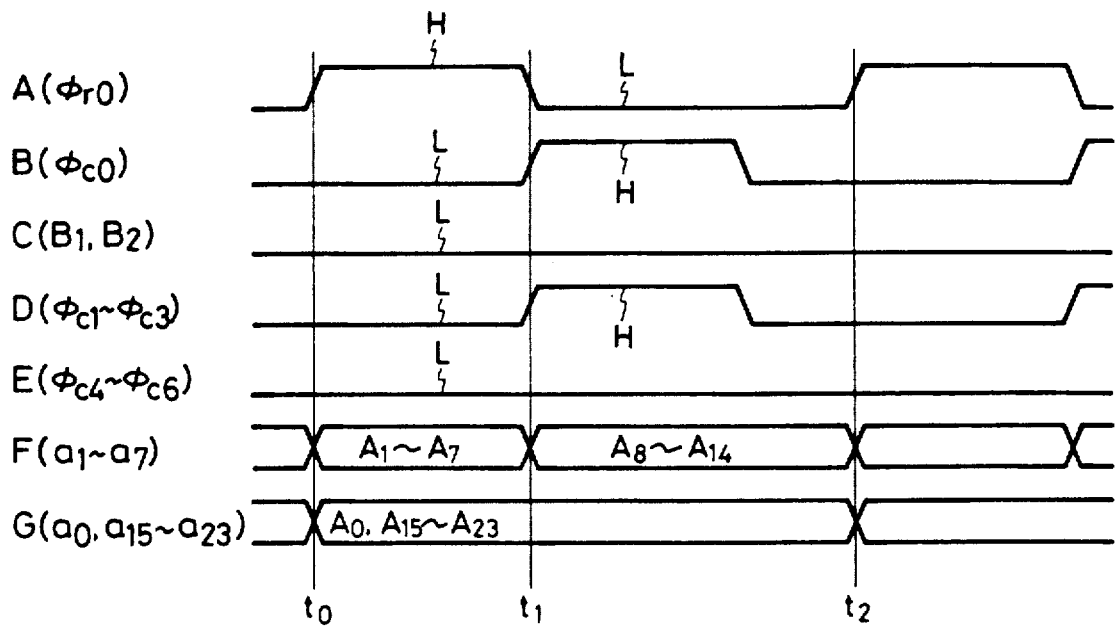
FIGS. 8, 9, 10 and 11 are timing charts of circuits in FIGS. 4 and 5.

FIG. 8 shows a timing chart in the case where the 16-kilobit DRAM is accessed. In the case of using the 16-kilobit DRAM, the outputs $a_1$ thru $a_7$ of the multiplexor MPX are supplied to the address terminals of such a DRAM through the address buffer A-BFF and the external bus lines A-BUSE in FIG. 1. Now, the circuit operations will be described by utilizing the timing chart of FIG. 8.

The timing signal $\phi_l$ for the latch circuits $LT_1$ thru $LT_{24}$ is brought to the high level in synchronism with the timing at which the address signals are supplied to the address bus lines A-BUS. The latch circuits $LT_1$ thru $LT_{24}$ accept the address signals of the address bus lines A-BUS in response to the timing signal $\phi_l$.

As illustrated at A in FIG. 8, the timing signal $\phi_{r0}$ is held at the high level for a period from a time $t_0$ to a time $t_1$ in accordance with the fact that the bit signal $B_0$ supplied to the control signal generator CSG in FIG. 1 is "1".

The clocked inverter circuits $IV_1$ thru $IV_4$ and $IV_{19}$ thru $IV_{21}$ in FIG. 4 are brought into their operating states in response to the timing signal $\phi_{r0}$ rendered the high level. Thus, as illustrated at F in FIG. 8, the outputs $a_1$ thru $a_4$ and $a_5$ thru $a_7$ of the multiplexor MPX are respectively brought to levels corresponding to the address signals $A_1$ thru $A_7$ of the address bus lines A-BUS.

As illustrated at B in Fi. 8, the timing signal $\phi_{c0}$ is brought to the high level in synchronism with the timing at which the timing signal $\phi_{r0}$ is rendered the low level.

The timing signals $\phi_{c1}$ thru $\phi_{c3}$ are brought to the high level in synchronism with the timing signal $\phi_{c0}$ as illustrated at D in FIG. 8 because the bit signals $B_1$ and $B_2$ supplied to the control signal generator CSG in FIG. 1 are "0" and "0" indicative of the 16-kilobit memory. The remaining timing signals $\phi_{c4}$ thru $\phi_{c6}$ are held at the low level irrespective of the timing signal $\phi_{c0}$ as illustrated at E in FIG. 8.

The clocked inverter circuits $IV_5$ thru $IV_8$ in FIG. 4 are brought into their operating states in response to the timing signal $\phi_{c0}$ rendered the high level, and those $IV_{14}$, $IV_{16}$ and $IV_{18}$ are brought into their operating states in response to the respective timing signals $\phi_{c1}$, $\phi_{c2}$ and $\phi_{c3}$ rendered the high level.

Therefore, the respective levels of the outputs $a_1$ thru $a_4$ of the multiplexor MPX are determined by the inverter circuits $IV_5$ thru $IV_8$. Similarly, the respective levels of the outputs $a_5$ thru $a_7$ are determined by the inverter circuits $IV_{14}$, $IV_{16}$ and $IV_{18}$.

The inputs of the inverter circuits $IV_5$ thru $IV_8$, the input of the inverter circuit $IV_{14}$, and the inputs of the inverter circuits $IV_{16}$ and $IV_{18}$ are respectively coupled to the latch circuits $LT_5$ thru $LT_8$, $LT_9$, and $LT_{10}$ and $LT_{11}$. The outputs $a_1$ thru $a_4$ and $a_5$ thru $a_7$ of the multiplexor MPX are therefore brought to levels corresponding to the address signals $A_{11}$ thru $A_{14}$, $A_8$, $A_9$ and $A_{10}$ respectively as illustrated at F in FIG. 8, in response to the timing signals $\phi_{c0}$ thru $\phi_{c3}$ rendered the high level.

As illustrated at A in FIG. 8, the timing signal $\phi_{r0}$ for the clocked inverter circuits $IV_1$ thru $IV_4$ and $IV_{19}$ thru $IV_{21}$ is brought to the low level in synchronism with the timing at which the clocked inverter circuits $IV_5$ thru $IV_8$, $IV_{14}$, $IV_{16}$ and $IV_{18}$ are operated. Therefore, the inverter circuits $IV_1$ thru $IV_4$ and $IV_{19}$ thru $IV_{21}$ do not affect the output levels of the inverter circuits $IV_5$ thru $IV_8$, $IV_{14}$, $IV_{16}$ and $IV_{18}$.

Owing to the above operations, the outputs $a_1$ thru $a_7$ determined at the time $t_0$ are set as the row address signals for the 16-kilobit DRAM, and the outputs $a_1$ thru $a_7$ determined at the time $t_1$ are set as the column address signals.

The outputs $a_1$ thru $a_7$ are maintained at the previous levels by means of holding capacitances such as stray capacitances existent in the respective output lines even when the timing signals $\phi_{c0}$ thru $\phi_{c3}$ are returned from the high level to the low level thereby to bring the clocked inverter circuits $IV_5$ etc. into their nonoperating states. These outputs $a_1$ thru $a_7$ are updated in response to the timing signal $\phi_{r0}$ rendered the high level again.

The outputs $a_0$ and $A_{15}$ thru $a_{23}$ which need not be address-multiplexed have their respective levels determined at the time $t_0$ as illustrated at G in FIG. 8. That is, the outputs $a_0$ and $A_{15}$ thru $a_{23}$ have their respective levels determined by the static inverter circuits $IV_{34}$, $IV_{28}$ thru $IV_{33}$ and $IV_{35}$ thru $IV_{37}$ which receive the outputs of the latch circuits $LT_{21}$, $LT_{15}$ thru $LT_{20}$ and $LT_{22}$ thru $LT_{24}$.

Though not especially restricted, the outputs $a_8$ thru $a_{14}$ are brought to levels corresponding respectively to the address signals $A_8$ thru $A_{14}$ at the time $t_0$. Since these outputs $a_8$ thru $a_{14}$ are not supplied to the address input terminals of the 16-kilobit DRAM, they may well be maintained at the levels corresponding to the address signals $A_8$ thru $A_{16}$.

In case of the arrangement of FIG. 4, to the end of simplifying the circuit arrangement, the address signals $A_8$ thru $A_{14}$ are supplied to the outputs $a_1$ thru $a_7$ after altering the order thereof properly. For example, the address signal $A_8$ is not supplied to the output $a_1$ but is supplied to the output $a_5$. The address signal $A_9$ is not supplied to the output $a_2$ (not shown) but is supplied to the output $a_9$. Such alterations, however, merely signify that the correspondence between logic addresses indicated by the address signals $A_1$ thru $A_{14}$ and the physical addresses of the DRAM is changed.

Figure 9:
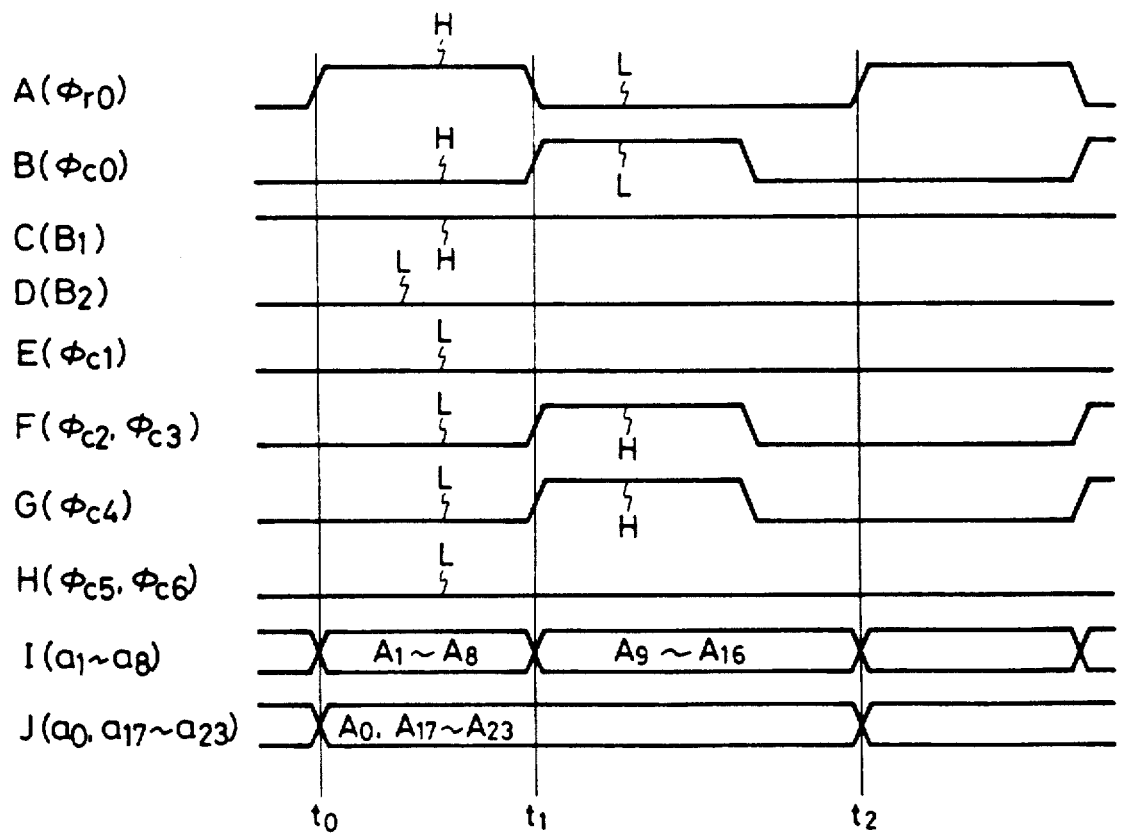

FIG. 9 shows a timing chart in the case where the 64-kilobit DRAM is accessed.

In this case, the timing signals $\phi_{c1}$, $\phi_{c5}$ and $\phi_{c6}$ are held at the low level as shown at E and H in FIG. 9, in response to the respective values "1" and "0" of the bit signals $B_1$ and $B_2$ (C and D in FIG. 9) and irrespective of the timing signal $\phi_{c0}$ (B in FIG. 9). As shown at F and G in FIG. 9, the timing signals $\phi_{c2}$, $\phi_{c3}$ and $\phi_{c4}$ are brought to the high level in synchronism with the timing signal $\phi_{c0}$.

As illustrated at I in FIG. 9, the outputs $a_1$ thru $a_8$ of the multiplexor MPX are brought to levels corresponding to the respective address signals $A_1$ thru $A_8$ in response to the timing signal $\phi_{r0}$ rendered the high level at a time $t_0$, and they are brought to levels corresponding to the respective address signals $A_9$ thru $A_{16}$ in response to the timing signals $\phi_{c0}$ and $\phi_{c2}$ thru $\phi_{c4}$ rendered the high level at a time $t_1$.

As illustrated at J in FIG. 9, the outputs $a_0$ and $a_{17}$ thru $a_{23}$ are brought to levels corresponding respectively to the address signals $A_0$ and $A_{17}$ thru $A_{23}$.

Figure 10:
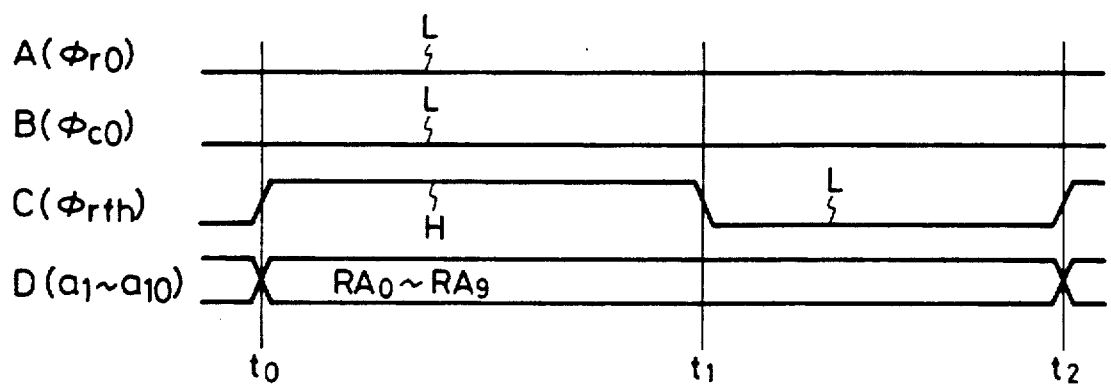

FIG. 10 shows a timing chart of the refresh operation.

In this case, the timing signals $\phi_{r0}$ and $\phi_{c0}$ are held at the low level as illustrated at A and B in FIG. 10. The clocked inverter circuits $IV_1$ thru $IV_8$ and $IV_{13}$ thru $IV_{27}$ which are coupled to the latch circuits in FIG. 4 are brought into the non-operating states.

When the refresh control signal $\phi_{ref}$ is rendered the high level at a time $t_0$ as shown at C in FIG. 10, the clocked inverter circuits $IV_{38}$ thru $IV_{47}$ in FIG. 4 are responsively brought into the operating states. As a result, the outputs $a_1$ thru $a_{10}$ of the multiplexor MPX are brought to levels corresponding to the respective address signals $RA_0$ thru $RA_9$ delivered from the refresh counter RC in FIG. 1, as illustrated at D in FIG. 10. In a case where the DRAM, not shown, which is coupled to the external bus lines A-BUSE in FIG. 1 is a 16-kilobit DRAM requiring row address signals of 7 bits, it is operated by the outputs $a_1$ thru $a_7$ among the outputs $a_1$ thru $a_{10}$. Likewise, in a case where the DRAM, not shown, requires row address signals of 8, 9 or 10 bits, it is operated by the outputs $a_1$ thru $a_8$, those $a_1$ thru $a_9$ or those $a_1$ thru $a_{10}$.

Figure 11:
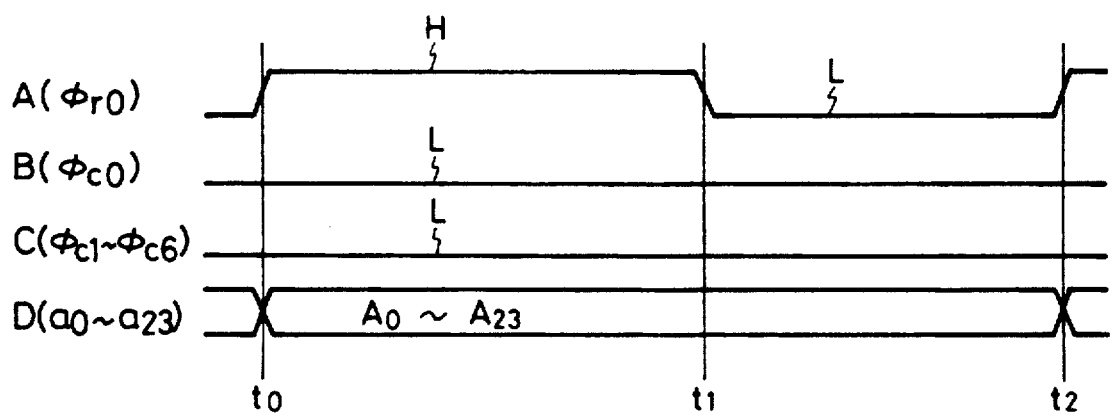

FIG. 11 shows a timing chart in the case where the SRAM or ROM which is not of the address multiplexing system is accessed.

In this case, the timing signals $\phi_{c0}$ and $\phi_{c1}$ thru $\phi_{c6}$ are all maintained at the low level as illustrated at B and C in FIG. 11.

As illustrated at D in FIG. 11, the outputs $a_0$ thru $a_{23}$ of the multiplexor MPX are brought to levels corresponding to the respective address signals $A_0$ thru $A_{23}$ in response to the timing signal $\phi_{r0}$ (A in FIG. 11) rendered the high level at a time $t_0$. Thus, the SRAM or ROM is accessed.

Figure 12:
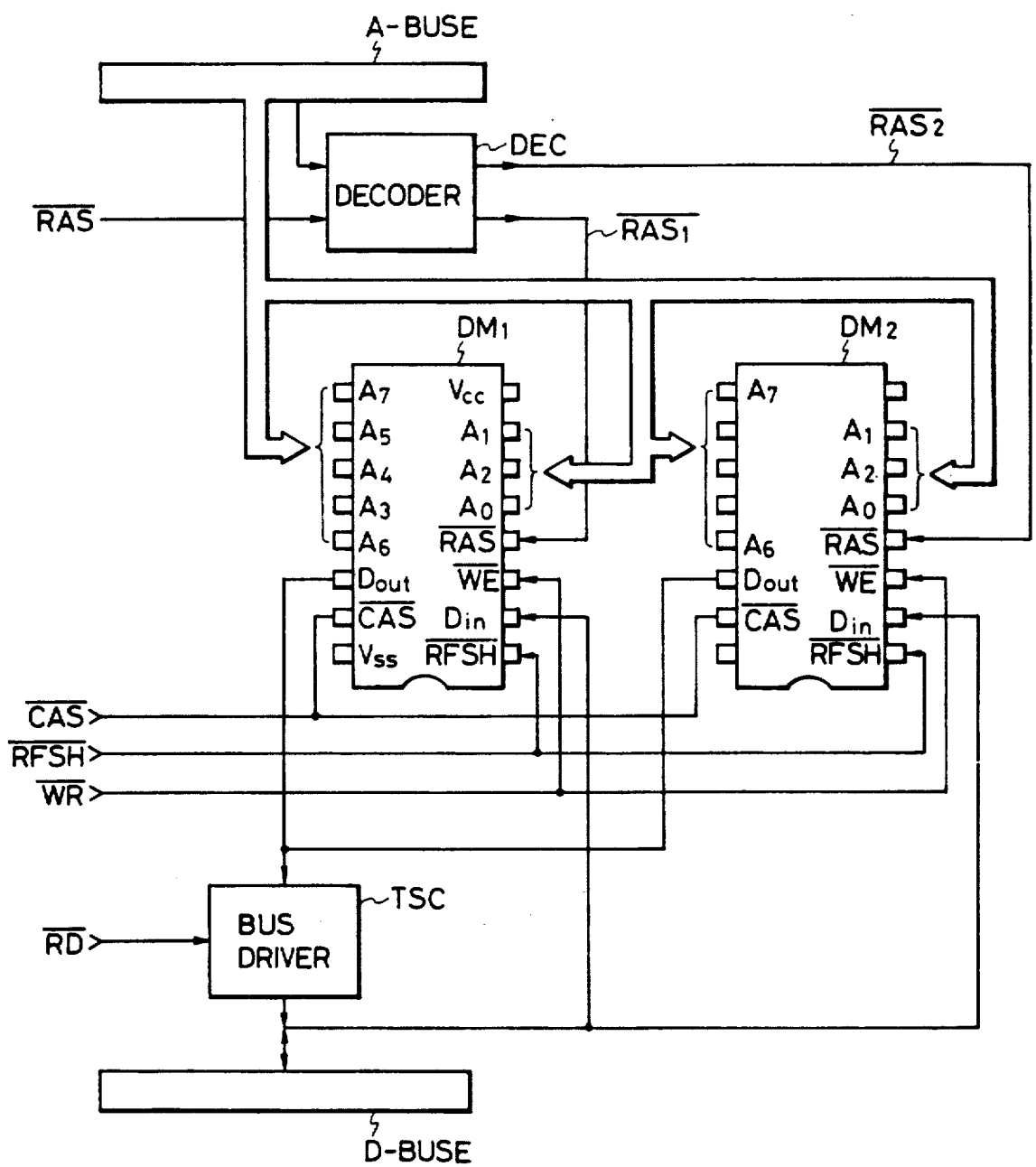
FIG. 12 is a connection diagram of external memories.

FIG. 12 is a connection diagram of external memories. Though not especially restricted, each of the external memories $DM_1$ and $DM_2$ is constructed of a dynamic RAM of 64 kbits which has address terminals $A_0$–$A_7$, a data output terminal DOUT, a column address strobe terminal CAS, a reference potential terminal (ground terminal) $V_{ss}$, a refresh control terminal $\overline{RFSH}$, a data input terminal DIN, a write enable terminal $\overline{WE}$, a row address strobe terminal $\overline{RAS}$ and a power source terminal $V_{cc}$. Each of the memories $DM_1$ and $DM_2$ is adapted to input/output data of one bit at a time. Herein, when it is necessary to input/output data of a plurality of bits at the same time, a plurality of memories are required for such data.

Referring to the figure, an external address bus A-BUSE is coupled to the external address terminals AT in FIG. 1, and an external data bus D-BUSE is coupled to the external data terminals DT in FIG. 1.

A decoder DEC forms row address strobe signals $\overline{RAS}_1$ and $\overline{RAS}_2$ to be supplied to the respective memories $DM_1$ and $DM_2$, on the basis of an address signal of 1 bit supplied through the external address bus A-BUSE and a row address strobe signal supplied through the terminal $\overline{RAS}$ in FIG. 1.

The address terminals $A_0$–$A_7$ of the memories $DM_1$ and $DM_2$ are fed with common address signals through the external address bus A-BUSE.

Thus, the memory $DM_1$ is selected by the signal $\overline{RAS}_1$ and the address signals applied to the address terminals $A_0$–$A_7$, while the memory $DM_2$ is similarly selected by the signal $\overline{RAS}_2$ and the signals of the address terminals $A_0$–$A_7$.

The column address strobe terminals $\overline{CAS}$, refresh control terminals $\overline{RFSH}$ and write enable terminals $\overline{WE}$ of the memories $DM_1$ and $DM_2$ are respectively connected in common to terminals $\overline{CAS}$, $\overline{RFSH}$ and $\overline{WR}$ in FIG. 1.

The data output terminals DOUT of the memories $DM_1$ and $DM_2$ are connected in common to the input terminal of a bus driver TSC, and the data input terminals DIN are connected to the external data bus D-BUSE, along with the output terminal of the bus driver TSC.

The bus driver TSC is constructed of a tri-state circuit which, subject to the low level of a read control signal $\overline{RD}$ supplied thereto, produces at its output terminal an output signal of a level corresponding to an input signal supplied to its input terminal. If the signal $\overline{RD}$ is at its high level, the output of the bus driver TSC is brought into a high impedance state.

According to this embodiment, the refresh counter RC is built in the microprocessor as shown in FIG. 1, and when the refresh address of this refresh counter RC is to be provided externally, the signal $\overline{RFSH}$ indicative of the corresponding timing is output. Therefore, a complicated refresh control circuit for forming the refresh signal of the dynamic RAM need not be constructed by an external circuit.

Besides, the microprocessor of this embodiment includes therein the register for setting the address range of the dynamic RAM, and when any address of the dynamic RAM is to be accessed, the address is automatically multiplexed within the chip.

Therefore, even in case of constructing a system in which the static RAM and the dynamic RAM coexist, the dynamic RAM can be accessed as simply as the static RAM without disposing any external circuit.

In that case, the read and write controls of the dynamic RAM are executed in accordance with the read control signal $\overline{RD}$ and write control signal $\overline{WR}$ which are output from the microprocessor portion CPU.

Moreover, with this embodiment, the address range of the dynamic RAM can be set at will by setting proper addresses in the address setting registers $AR_1$ and $AR_2$.

The above embodiment is generally used in such a way that the bits $B_0$ of the configuration registers $CR_1$–$CR_3$ are reset to "0" in a reset state, thereby to first establish a ROM access state and execute a program in the ROM, whereupon the address setting registers $AR_1$ and $AR_2$ are previously set in conformity with the system arrangement. It is also possible, however, to alter the set values of the address setting registers $AR_1$ and $AR_2$ in the course of the program so as to change the address range of the dynamic RAM.

Thus, it becomes possible to construct, for example, a system in which the address area of the ROM and that of the dynamic RAM overlap, the overlap area being used as the ROM area or the RAM area as is necessary. In addition, the respective address spaces which are set by the address setting registers $AR_1$ $AR_2$ may correspond to a plurality of sorts of memories. By way of example, the ROM and the static RAM which have the same addressing system can correspond within a single address space. In this case, a partial address space in the single address space is caused to correspond to the ROM, and another partial address space is caused to correspond to the static RAM.

Further, in the embodiment, the configuration registers $CR_1$–$CR_3$ are furnished with the bits $B_1$ and $B_2$ indicating the capacities of the dynamic RAMs, so that a system can be constructed using the RAMs which have any desired capacities of 16 kbits–1 Mbits. In this regard, those bits of each of the configuration registers $CR_1$–$CR_3$ which indicate the capacity of the dynamic RAM are not restricted to the 2 bits $B_1$ and $B_2$ as in the embodiment, but they may well be replaced with 1 bit or with 3 or more bits.

Likewise, 2 bits may well be used instead of the 1 bit $B_0$ indicating the information as to whether or not the address range of the dynamic RAM is concerned, thereby making it possible to distinguish the address ranges of the ROM and the static RAM. The configuration registers $CR_1$–$CR_3$ may well be furnished with bits which bear information other than the foregoing (for example, a bit which indicates whether a corresponding address area is read-only or read/write, a bit which indicates whether a program or data is concerned, and a bit which indicates whether a system area or a user area is concerned).

In the embodiment, the two address setting registers are disposed so as to make it possible to trisect the address space owned by the microprocessor. However, the number of the registers is not restricted to 2, but 1 register or at least 3 registers can also be disposed.

While the embodiment has been explained as to the application of this invention to the 16-bit microprocessor, the invention is also applicable to an 8-bit microprocessor.

[Embodiment 2]

Figure 13:
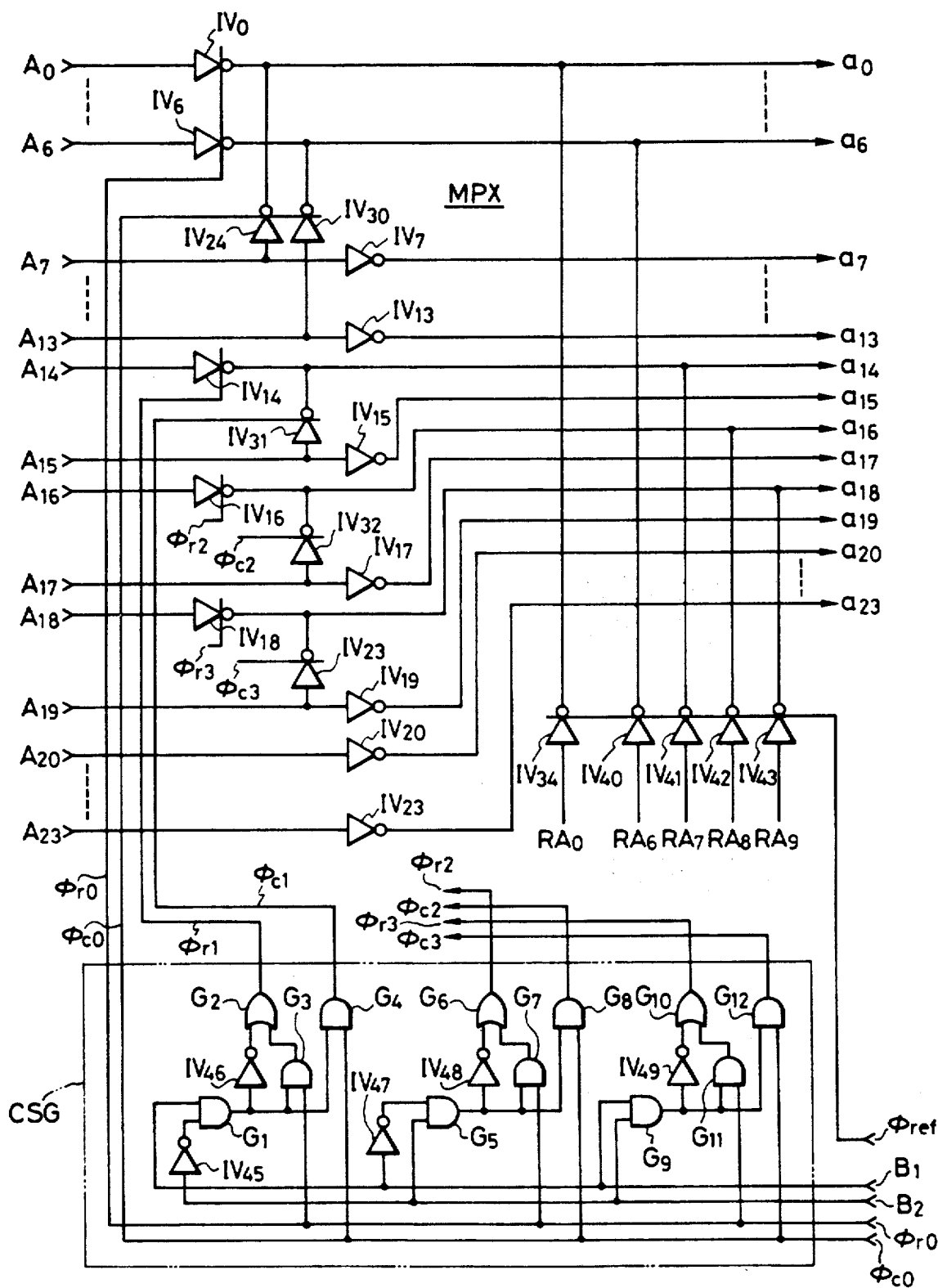
FIG. 13 is a circuit diagram of another embodiment.

FIG. 13 is a circuit diagram of an address multiplexor MPX and a part of a control signal generator CSG in another embodiment.

In this embodiment, timing signals $\phi_{r0}$, $\phi_{c0}$ and $\phi_{ref}$ in the control signal generator CSG are respectively the same as those of the preceding embodiment.

In the control signal generator CSG, an inverter circuit $IV_{45}$ and an AND gate circuit $G_1$ constitute a decoder which forms an output signal of high level when bit signals $B_1$ and $B_2$ are "1" and "0" respectively, namely, when the bit signals $B_1$ and $B_2$ indicates a memory such as 64-kilobit memory of 1-bit format.

A timing signal $\phi_{r1}$ to be output from an OR gate circuit $G_2$ is brought to the high level in synchronism with the timing signal $\phi_{r0}$ if the bit signals $B_1$ and $B_2$ indicate the 64-kilobit memory, and it is maintained at the high level irrespective of the timing signal $\phi_{r0}$ unless the bit signals $B_1$ and $B_2$ indicate the 64-kilobit memory.

A timing signal $\phi_{r2}$ to be output from an OR gate circuit $G_6$ is brought to the high level in synchronism with the timing signal $\phi_{r0}$ if the bit signals $B_1$ and $B_2$ are "0" and "1" respectively, namely, if they indicate a memory such as 256-kilobit memory of 1-bit format, and it is maintained at the high level irrespective of the timing signal $\phi_{r0}$ if they are not.

Likewise, a timing signal $\phi_{r3}$ to be output from an OR gate circuit $G_{10}$ is brought to the high level in synchronism with the timing signal $\phi_{r0}$ if the bit signals $B_1$ and $B_2$ are "1" and "1", namely, if they indicate a memory such as 1-megabit memory of 1-bit format, and it is maintained at the high level if they are not.

A timing signal $\phi_{c1}$ to be output from an AND gate circuit $G_4$ is brought to the high level, only when the bit signals $B_1$ and $B_2$ indicate the 64-kilobit memory and besides the timing signal $\phi_{c0}$ is brought to the high level.

Likewise, a timing signal $\phi_{c2}$ to be output from an AND gate circuit $G_8$ is brought to the high level, only when the bit signals $B_1$ and $B_2$ indicate the 256-kilobit memory and besides the timing signal $\phi_{c0}$ is brought to the high level. Further, a timing signal $\phi_{c3}$ is brought to the high level, only when the bit signals $B_1$ and $B_2$ indicate the 1-megabit memory and besides the timing signal $\phi_{c0}$ is brought to the high level.

The multiplexor MPX is constructed of clocked inverter circuits $IV_0$ thru $IV_6$, $IV_{24}$ thru $IV_{30}$, $IV_{14}$, $IV_{31}$, $IV_{16}$, $IV_{32}$, $IV_{18}$, and $IV_{33}$ and static inverter circuits $IV_7$ thru $IV_{13}$, $IV_{15}$, $IV_{17}$, and $IV_{19}$ thru $IV_{23}$, the input terminals of which receive the address signals $A_0$ thru $A_{23}$ at the address bus lines A-BUS in FIG. 1, and clocked inverter circuits $IV_{34}$ thru $IV_{43}$, the input terminals of which receive the respective outputs $RA_0$ thru $RA_9$ of the refresh counter RC in FIG. 1.

In accordance with this embodiment, in case of using a DRAM which requires 7-bit row address signals and 7-bit column address signals, the address signals $A_0$ thru $A_6$ are regarded as the row address signals, and those $A_7$ thru $A_{13}$ are regarded as the column address signals. In this case, the outputs $a_0$ thru $a_6$ of the multiplexor MPX are supplied to the address terminals of the DRAM.

The outputs $a_0$ thru $a_6$ are rendered levels corresponding to the address signals $A_0$ thru $A_6$ when the timing signal $\phi_{r0}$ is rendered the high level, because the inverter circuits $IV_0$ thru $IV_6$ are brought into their operating states in response to this high level, and they are rendered levels corresponding to the address signals $A_7$ thru $A_{13}$ when the timing signal $\phi_{c0}$ is rendered the high level, because the inverter circuits $IV_{24}$ thru $IV_{30}$ are brought into their operating states in response to this high level. At this time, the outputs $a_7$ thru $a_{23}$ of the multiplexor MPX are held at levels corresponding to the respective address signals $A_7$ thru $A_{23}$. By way of example, the outputs $a_7$ thru $a_{13}$ have their respective levels determined by the static inverter circuits $IV$ thru $IV_{13}$. The inverter circuits $IV_{14}$, $IV_{16}$ etc. are put in their operating states because the timing signals $\phi_{r1}$, $\phi_{r2}$ etc. are maintained at the high level without regard to the timing signal $\phi_{r0}$. Therefore, the outputs $a_{14}$, $a_{16}$ etc. are brought to levels corresponding to the address signals $A_{14}$, $A_{16}$ etc.

In case of using a DRAM which requires 8-bit row address signals and 8-bit column address signals, the address signals $A_0$ thru $A_6$ and $A_{14}$ are regarded as the row address signals, and those $A_7$ thru $A_{13}$ and $A_{15}$ are regarded as the column address signals. The address signals $A_7$ thru $A_{13}$ and $A_{15}$ are supplied to the outputs $a_0$ thru $a_6$ and $a_{14}$ at the timing of the timing signal $\phi_{c0}$. Therefore, the outputs $a_0$ thru $a_6$ and $a_{14}$ are fed to the address input terminals of the DRAM through the address buffer A-BFF in FIG. 1.

In case of using a DRAM which requires 9-bit row address signals and 9-bit column address signals, the address signals $A_0$ thru $A_6$, $A_{14}$ and $A_{16}$ are regarded as the row address signals, and the address signals $A_7$ thru $A_{13}$, $A_{15}$ and $A_{17}$ are regarded as the column address signals. The address signals $A_0$ thru $A_6$, $A_{15}$ and $A_{17}$ are supplied to the outputs $a_0$ thru $a_6$, $a_{14}$ and $a_{16}$ at the timing of the timing signal $\phi_{c0}$. Therefore, the outputs $a_0$ thru $a_6$, $a_{14}$ and $a_{16}$ are supplied to the address input terminals of the DRAM.

In case of using a DRAM which requires 10-bit row L address signals and 10-bit column address signals, the address signals $A_0$ thru $A_6$, $A_{14}$, $A_{16}$ and $A_{18}$ are regarded as the row address signals, and those $A_7$ thru $A_{13}$, $A_{15}$, $A_{17}$ and $A_{19}$ are regarded as the column address signals. The address signals $A_7$ thru $A_{13}$, $A_{15}$, $A_{17}$ and $A_{19}$ are supplied to the outputs $a_0$ thru $a_6$, $a_{14}$, $a_{16}$ and $a_{18}$ at the timing of the timing signal $\phi_{c0}$. Therefore, the outputs $a_0$ thru $a_6$, $a_{14}$, $a_{16}$ and $a_{18}$ are supplied to the address input/output terminals of the DRAM.

At the timing of a refresh operation, the timing signals $\phi_{r0}$ and $\phi_{c0}$ are brought to the low level and the refresh control signal $\phi_{ref}$ is brought to the high level as in the preceding embodiment. In response to them, the clocked inverter circuits $IV_{34}$ thru $IV_{43}$ in FIG. 13 are brought into their operating states, and the outputs $RA_0$ thru $RA_9$ of the refresh counter RC in FIG. 1 are supplied to the outputs $a_0$ thru $a_6$, $a_{14}$, $a_{16}$ and $a_{18}$ through these inverter circuits $IV_{34}$ thru $IV_{43}$.

When an SRAM or ROM is to be accessed, the timing signal $\phi_{c0}$ in the circuit of FIG. 13 is maintained at the low level as in the preceding embodiment. The timing signals $\phi_{c1}$ thru $\phi_{c3}$ are maintained at the low level in accordance with the timing signal $\phi_{c0}$. In response to them, the column selection circuits, namely, the clocked inverter circuits $IV_{24}$ thru $IV_{30}$ and $IV_{31}$ thru $IV_{33}$ are put in their non-operating states. The outputs $a_0$ thru $a_{23}$ are brought to levels corresponding to the address signals $A_0$ thru $A_{23}$ in synchronism with the timing signal $\phi_{r0}$.

With respect to the multiplexor of the arrangement in FIG. 3, the number of the clocked inverter circuits whose output terminals are connected in common with one another in order to form one output is reduced to 3.

According to this invention, the following effects can be attained:

(1) A microprocessor is provided therein with a refresh counter which generates a refresh address, a control signal formation circuit which forms control signals necessary for accessing a dynamic RAM, such as a $\overline{RAS}$ signal and a $\overline{CAS}$ signal, and a register which designates either the access to the dynamic RAM or access to a static RAM (or ROM), an address outputting mode being alterable in accordance with the content of this register, so the function is achieved which makes it possible to access, not only the static RAM but also the dynamic RAM and perform refresh without disposing any external circuit, and which produces the effects that the design of a system employing the dynamic RAM is facilitated and that the packaging area of the system is reduced.

(2) A microprocessor is provided therein with a refresh counter which generates a refresh address, a control signal formation circuit which forms control signals necessary for accessing a dynamic RAM, such as a $\overline{RAS}$ signal and a $\overline{CAS}$ signal, and a register which designates either the access to the dynamic RAM or access to a static RAM (or ROM), an address outputting mode being alterable in accordance with the content of this register. The microprocessor is furnished with registers that designate the address ranges and capacities of the dynamic RAMs to be used, in other words, the number of bits of address signals, so the function is achieved which makes it possible to change the capacities or number of the dynamic RAMs to-be-used freely to some extent, and which produces the effect that the versatility of the microprocessor is enhanced.

While, in the above, the invention made by the inventor has been concretely described in conjunction with embodiments, the present invention is not restricted to the foregoing embodiments but it can be variously modified within a scope not departing from the purpose thereof. For example, in the embodiments, the address range of a dynamic RAM is made variable by a register, but it is also possible to replace the register with means to generate a fixed address and to fixedly divide an address space.

Further, the configuration registers $CR_1$–$CR_3$ themselves may well be omitted so as to uniquely designate which memory an address range divided by the address setting registers $AR_1$ $AR_2$ belongs to, in accordance with the decision output of the decision circuit DCD and to operate the address multiplexor MPX in correspondence therewith.

While, in the above, the invention made by the inventor has been principally described as to the application thereof to a microprocessor in the shape of one chip which forms the background field of utilization, the present invention is not restricted thereto but can be utilized also in case of constructing a multi-chip microprocessor.

I claim:

1. A microprocessor formed on a single semiconductor substrate to be externally coupled to an external memory device, said microprocessor comprising:
    a CPU;
    an address bus coupled to said CPU to which an address signal including a plurality of bits is applied, said address signal defining an address in said external memory device;
    a data bus coupled to said CPU for inputting and outputting data;
    external data terminals coupled to said data bus;
    external address terminals coupled to said address bus via address switching means;
    first register means for storing address data identifying a boundary between a first address space and a second address space of said external memory device to be coupled to said external data terminals and said external address terminals of said microprocessor, wherein said external memory device includes a first memory having said first address space defining a range of addresses assigned thereto and a second memory having said second address and defining a range of addresses assigned thereto;
    second register means for storing attributive data including
    first means for storing attributive data corresponding to an attribute of said first memory, and
    second means for storing attributive data corresponding to an attribute of said second memory;
    comparator means coupled to said first register means and said address bus for comparing an address signal of a plurality of bits on said address bus to said address data stored in said first register and for outputting a signal indicating whether said address signal on said address bus designates an address within the first address space;
    selecting means coupled to said comparator means and said second register means and responsive to an output of said comparator means for selecting either said attributive data stored in said first means or said attributive data stored in said second means of said second register means and outputting said selected attributive data; and
    control means coupled to said selecting means and said address switching means and responsive to said selected attributive data for controlling said address switching means so that said address switching mean delivers said address signal on said address bus to said external address terminals according to an address multiplexing system according to which a first part of said plurality of bits of said address signal and a second part of said plurality of bits of said address signal are delivered to said external address terminals, individually, when said selected attributive data indicates that said external memory device should be addressed according to said address multiplexing system.

2. A microprocessor according to claim 1, wherein said first register means is coupled to said data bus.

3. A microprocessor according to claim 2, wherein said second register means is coupled to said data bus.

4. A microprocessor according to claim 1, wherein said address switching means includes means for latching one of said first and second parts of said plurality of bits of said address signal on said address bus.

5. A microprocessor according to claim 1, wherein said first and second parts of said plurality of bits of said address signal correspond to first and second halves of said plurality of bits of said address signal, and wherein said first and second halves of said plurality of bits of said address signal are both delivered to same terminals in said external address terminals when said selected attributive data indicates that said external memory device should be addressed according to the address multiplexing system.

6. A microprocessor according to claim 1, wherein said address switching means allows said address signals to pass therethrough to be supplied to said address bus at said external address terminals when said selected attributive data indicates that said external memory device is not to be addressed according to said address multiplexing system.

7. A microprocessor according to claim 1, further comprising:
    data buffer coupled between said data bus and said external data terminals.

8. A microcomputer according to claim 1, further comprising:
    a refresh address formation means coupled to said address switching means for providing refresh address data and a refresh timing signal for the external memory device which is to be addressed according to said address multiplexing system;
    wherein said control means controls said address switching means in response to said refresh timing signal so that said address switching means provides said refresh address data to said external address terminal.

9. A microcomputer according to claim 1, wherein said first and second parts of said plurality of bits of said address signal correspond to row and column address signals of said external memory device, respectively, wherein said control means includes means for providing a row address strobe signal and a column address strobe signal, said row address strobe signal being provided in synchronism with an output of said row address signal, said column address strobe signal being provided in synchronism with an output of said column address signal, wherein said microprocessor further comprises:
    first and second terminals at which said row and second address strobe signals are received, respectively.

10. A microcomputer according to claim 1, wherein said attributive data stored in said first and second means each includes information indicating a memory capacity of the corresponding memory in the external memory device, and wherein said control means controls said address switching means in response to the information regarding the memory capacity in the selected attributive data.

11. A microcomputer system comprising:
    an external memory device including at least one dynamic RAM of a first memory part and a second memory part other than said dynamic RAM, said external memory device having a first address space defining a range of addresses assigned to said at least one dynamic RAM of said first memory part and a second address space defining a range of addresses assigned to said second memory part; and a microprocessor coupled to said external memory device for accessing said external memory device, said microprocessor including a CPU coupled to an address bus and to a data bus, address switching means coupled between said address bus and a plurality of external address terminals for switching said address bus between said plurality of external address terminals, first register means for storing address data identifying a boundary between said first and second address space, second register means for storing addressing system data including first means for storing addressing system data of said first memory part and second means for storing addressing system data of said second memory part, comparator means coupled to said address bus and said first register means and responsive to an address signal of a plurality of bits supplied from said CPU to said address bus for comparing said address signal with said address data stored in said first register means and for outputting a signal indicating whether said address signal designates an address within said first address space of said first memory part, selecting means coupled to said comparator means and said second register and responsive to an output of said comparator means for selecting addressing system data of said first memory part when said output of said comparator means indicates that said address signal designates an address within said first address space of said first memory part, and control means coupled to said selecting means and said address switching means and responsive to said selected address system data for controlling said address switching means to deliver said address signal to said external address terminals according to an address multiplexing system according to which a first part of said plurality of bits of said address signal and a second part of said plurality of bits of said address signal are delivered to said external address terminals, individually.

12. A microcomputer system according to claim 11, wherein said first register means has inputs coupled to said data bus.

13. A microcomputer system according to claim 11, wherein said second register means has inputs coupled to said data bus.

14. A microcomputer system according to claim 11, wherein said second memory part includes a static type RAM.

15. A microcomputer system according to claim 11, wherein said second memory part includes a ROM.

16. A microcomputer system according to claim 11, further comprising:

a refresh address formation means coupled to said address switching means for forming refresh address data for the dynamic RAM of said first memory part and for providing a refresh timing signal to the dynamic RAM of said first memory part;

wherein said control means controls said address switching means in response to said refresh timing signal so that said address switching means provides said refresh address data to said external address terminals.

17. A microprocessor according to claim 11, further comprising:

wherein said first and second parts of said plurality of bits of said address signal correspond to row and column address signals of said at least one dynamic RAM, respectively;

wherein said control means includes means for providing a row address strobe signal and a column address strobe signal to said at least one dynamic RAM;

wherein said row address strobe signal is provided in synchronism with an output of said row address signal; and wherein said column address strobe signal is provided in synchronism with an output of said column address signal.

18. A microcomputer system of claim 11, wherein said first and second parts of said plurality of bits of said address signal correspond to first and second halves of said plurality of bits of said address signal, and wherein said first and second halves of said plurality of bits of said address signals are both delivered to same terminals in said external address terminals when said selected attributive data indicates that said external memory device should be addressed according to the address multiplexing system.

19. The microcomputer system of claim 11, wherein said address switching means allows said address signals to pass therethrough to be supplied to said address but at said external address terminals when said selected attributive data indicates that the external memory device is not to be addressed according to said address multiplexing system.

20. The microcomputer system of claim 11, wherein said address switching means includes means for latching one of said first and second parts of said plurality of bits of said address signal on said address bus.

21. The microcomputer system according to claim 11, wherein said attributive data stored in said first and second means each includes information indicating a memory capacity of the corresponding memory in the external memory device, and wherein said control means controls said address switching means in response to the information regarding the memory capacity in the selected attributive data.

* * * * *